United States Patent [19]

Candle

[11] Patent Number: 4,709,806
[45] Date of Patent: Dec. 1, 1987

[54] FOLDING BELT SYSTEM AND SAID BELT
[75] Inventor: Richard D. Candle, Akron, Ohio
[73] Assignee: The Goodyear Tire & Rubber Company, Akron, Ohio
[21] Appl. No.: 860,409
[22] Filed: May 7, 1986

Related U.S. Application Data

[63] Continuation of Ser. No. 630,786, Jul. 13, 1984.

[51] Int. Cl.[4] ............................................. B65G 15/08
[52] U.S. Cl. ..................................... 198/819; 198/500
[58] Field of Search ............... 198/818, 819, 820, 821, 198/500; 474/91

[56] References Cited

U.S. PATENT DOCUMENTS

| | | | |
|---|---|---|---|
| 1,100,654 | 6/1914 | Church | 198/821 |
| 2,839,180 | 6/1958 | Ackers | 198/819 |
| 2,854,351 | 9/1958 | Wilson | 474/91 |
| 3,338,383 | 8/1967 | Hashimoto | 198/819 |
| 3,615,152 | 10/1971 | Bouzat et al. | 198/818 X |
| 4,149,624 | 4/1979 | Douty et al. | 198/500 |
| 4,387,801 | 6/1983 | Hoover | 198/821 |
| 4,410,082 | 10/1983 | McGinnis | 198/819 X |

FOREIGN PATENT DOCUMENTS

| | | | |
|---|---|---|---|
| 836621 | 4/1952 | Fed. Rep. of Germany | 198/820 |
| 1934342 | 7/1970 | Fed. Rep. of Germany | 198/819 |
| 827538 | 4/1938 | France | 198/819 |
| 1257427 | 2/1961 | France | 198/821 |
| 185013 | 6/1936 | Switzerland | 198/819 |
| 887698 | 1/1962 | United Kingdom | 198/819 |
| 1116887 | 6/1968 | United Kingdom | 198/819 |
| 458484 | 3/1975 | U.S.S.R. | 198/819 |

Primary Examiner—Robert J. Spar
Assistant Examiner—Jonathan D. Holmes
Attorney, Agent, or Firm—R. D. Thompson; J. D. Wolfe

[57] ABSTRACT

A folding belt system having the head and tail pulleys twice the width of the support idler rolls and having a transition length of about 7 to 15 times the width of the belt between the fold or hinge lines, where transition width support rolls are located. The folding conveyor belt is composed of a central belt section which has specially constructed flexible areas at each edge extending longitudinally the length of the belt to which are attached cover flaps. The cover flaps completely enclose the load while it is conveyed. This reduces spillage, dust, and contamination while providing highly enhanced conveying capacity. The flaps may be of the same or different construction than the center section of the belt. In it's preferred embodiment the folded belt is constructed by suitably providing the top cover of a fully cured conveyor belt with longitudinal grooves formed by slitting and removing a strip of rubber at the appropriate locations to form preferentially flexible longitudinal hinge areas in the belt with the dominions outside the hinges comprising the cover flaps. Alternately the hinge areas can be molded into the belt at the time of manufacture.

11 Claims, 8 Drawing Figures

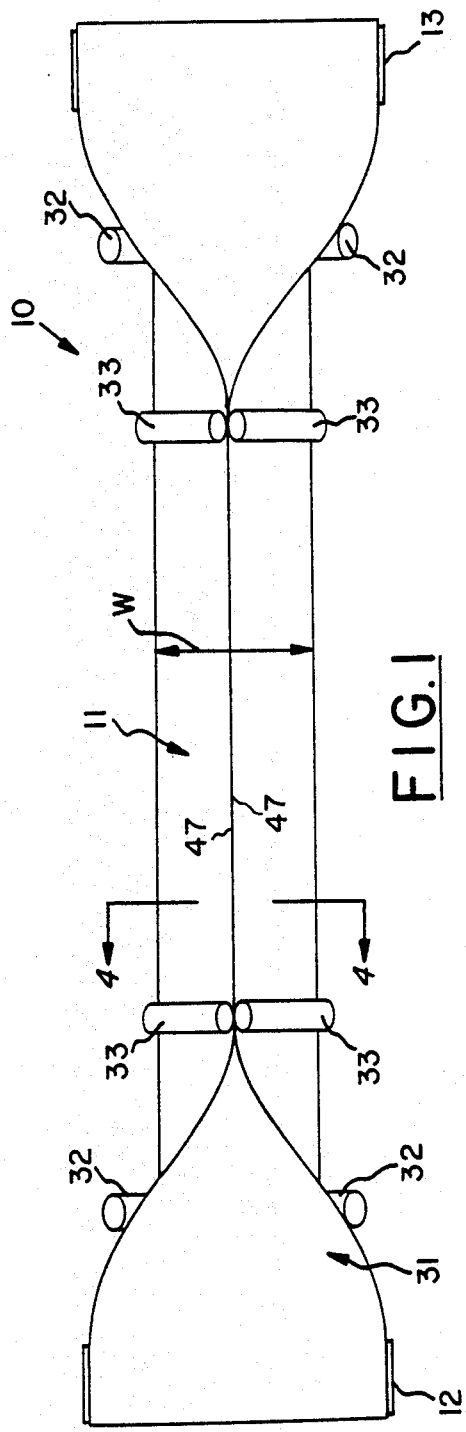
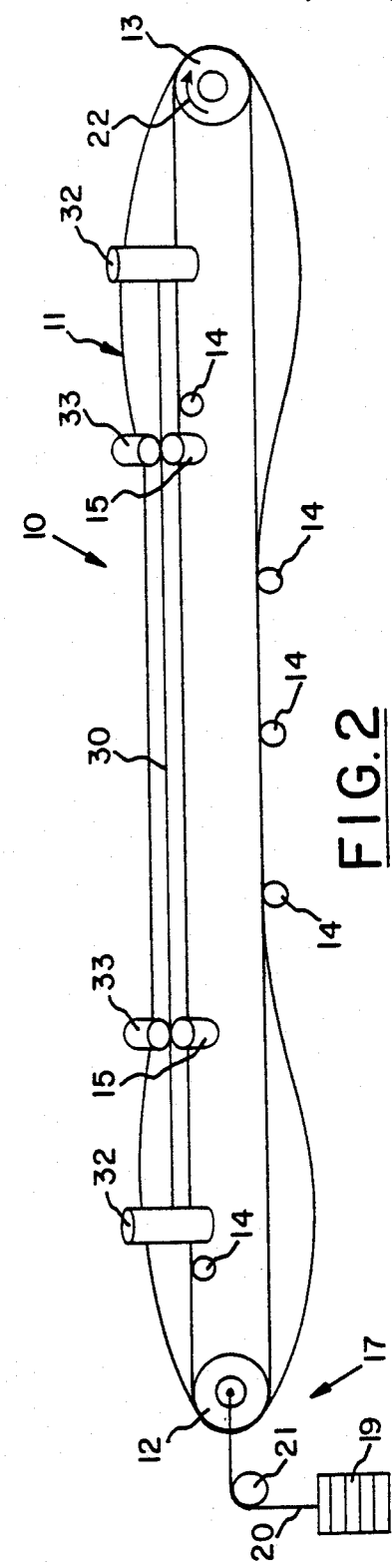
FIG.1
FIG.2

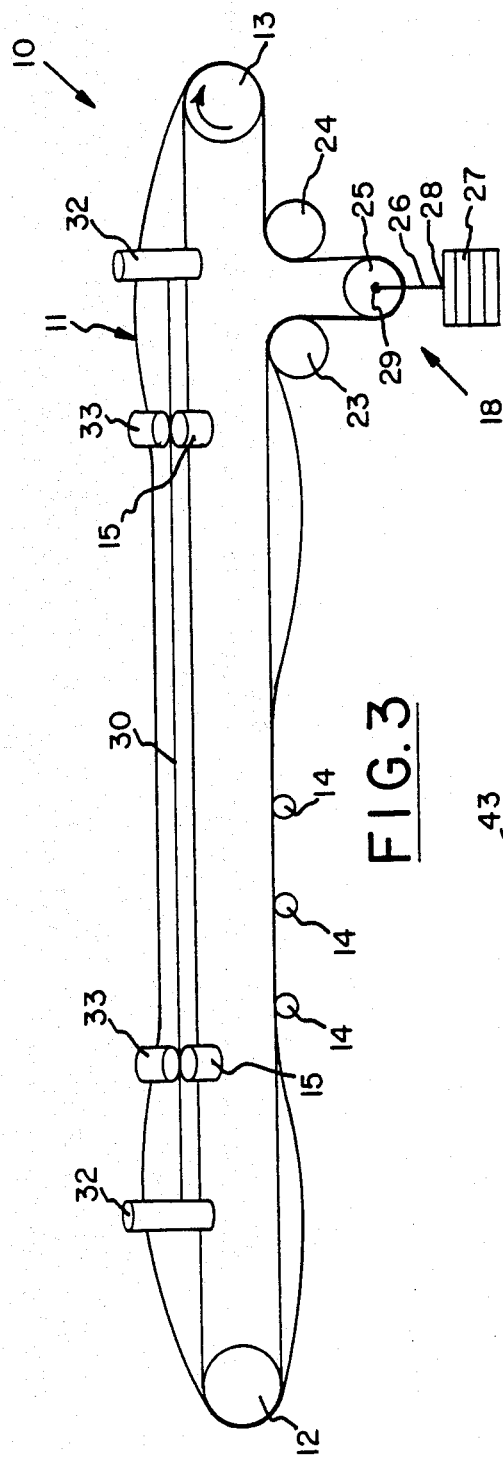
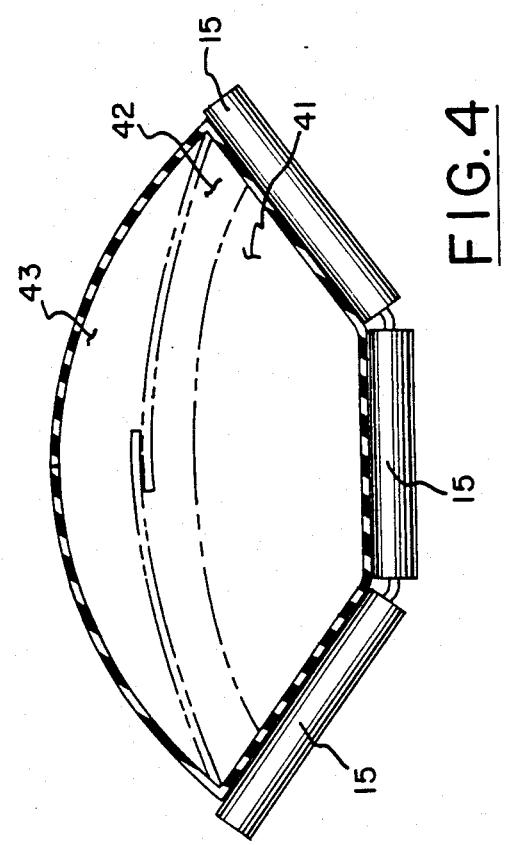
FIG. 3
FIG. 4

1

FOLDING BELT SYSTEM AND SAID BELT

This is a continuation of application Ser. No. 630,786 filed on July 13, 1984.

TECHNICAL FIELD

This invention relates to a folding belt conveyor systems and more particularly relates to folding belts and methods of making the same. This conveyor system, adapted to move a folding conveyor belt by means of the usual drive rolls while supported on idler rolls, has a folding belt which in one view is a conventional belt having a pair of continuous, flexible, longitudinal cover flaps attached hingeably along each longitudinal edge of said belt to permit the flaps to be folded to fully cover the load and confine the material being conveyed on the belt or to move to the axially unfolded position. This folding belt may be loaded with the cover flaps unfolded to the fully opened position or with the cover flaps unfolded only sufficiently to permit on-loading of the material. The width, W, of a folding belt is defined as the distance between the two longitudinal hinges. This dimension W defines the conveying capacity of the belt at a specified speed. First, the inherent containment provided by the cover flaps allows a fold belt to be loaded all the way to its hinge area, thus eliminating the unused edge distance required by conventional belting to prevent spillage. This allows a fold belt to carry a substantially greater load than a conventional belt on the same width conveyor system. Thus, a folding belt conveyor system with a belt width of W can carry a larger load than a conventional belt of the same width of W. At its minimum and maximum capacity the folding belt can carry a load respectively 50 and 100 percent more relative to the conventional belt of the same width W and also protect the load from external contamination. In addition, the enclosed load feature of the fold belt can substantially reduce the need for metal shrouding in applications where dust is a problem. This also offers many advantages including easier conveyor maintenance and reduced dust collecting systems requirements. The result can be improved conveyor safety and reduced costs. And finally, by containing the load with its flaps, a fold belt is able, to convey materials up steeper inclines and operate at higher speeds with less spillage than conventional belts. Consequently, conveyor operation time can be reduced while efficiency is increased.

PRIOR ART

The conventional flexible belt conveyor systems are open and thus the material carried on the belt can be contaminated by rain, dust and related contaminates as the conventional belt is open to the atmosphere. Consequently, the trade has resorted to metal shrouding or related enclosure means to protect the belt from contamination, but this shrouding increases the volume for the accumulation of dust and thereby allows for the creation of large masses of explosive mixtures. Although the folding belt conveyor systems are known, these systems require special hardware for the conveyor system or were subjected to appreciable spillage due to the belt construction. This material loss and accumulated dust contributed to the explosion hazards in handling coal, ore, minerals, grain, feed, and flour to mention only a few of the bulk materials handled on conveyor belts.

DISCLOSURE AND PRACTICE OF THE INVENTION, INCLUDING THE BEST MODE

The nature of this invention and its advantages and benefits can be seen and understood by reference to the drawings wherein:

FIG. 1 is a schematic plan view of the conveying apparatus of this invention.

FIG. 2 is a schematic elevational view of the apparatus having a tensioning means in the tail terminal.

FIG. 3 is a schematic elevational view of the apparatus of FIG. 1 having the tensioning means near the head terminal.

FIG. 4 is a cross-sectional view through FIG. 1 along lines 4—4 showing the minimum and maximum additional load carrying capacity aspect of the conveying apparatus.

Figure 5:
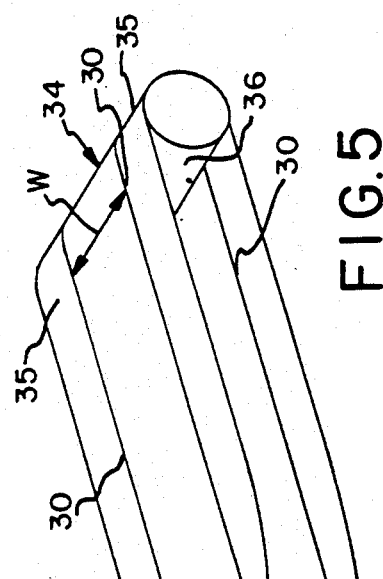
FIG. 5 is an enlarged view of the transition area of the conveying apparatus showing the width of the terminal pulley and the idler rolls relative to W, the width of the belt between the fold lines.

Referring to the drawings and specifically figures 1, 2, and 3 a folding belt conveyor 10 is shown in schematic outline where numeral 11 designates the folding belt. The belt 11 passes over a head roll, herein designated as pulley 13, and a tail roll herein designated as pulley 12. These head and tail rolls are sometimes called terminals. The belt intermediate the head and tail terminals is supported by a series of conventional idler rolls 14 as best seen in FIGS. 2 and 3. Preferred forms of the idler roll as shown in FIG. 4 comprise three in line rolls 15 mounted to cause the belt to form the conventional trough shape. It should be appreciated that rolls 14 can be straight or any other shape in conveyor usage. Also, the conveyor system may have tension means such as the ones, shown in FIGS. 2 and 3 and designated generally as a tail tension means 17 and a head tension means 18. The amount of tension on the tail roll 12 is controlled by applying weights 19 to the tension member 20 usually a chain, rope, or cable that passes over tension pulley 21 and has one end attached to the tail roll 12 in a manner to permit the tail roll 12 to rotate under suitable rotation means such as a motor driven roll (not shown) and thus moves the belt in the direction indicated by arrow 22. The tension system used at the head end preferably is positioned as shown in FIG. 3 as this allows the load on the belt to be discharged without being obstructed by the tension means. The tension means shown in FIG. 3 comprises rolls 23 and 24 having a tension roll 25 positioned between rolls 23 and 24 to pull the belt down tight in the manner shown in FIG. 3. The amount of pull down or tension applied to the belt is a function of the amount of weights 27 attached to one end 28 of tension member 26 and having its other end 29 attached rotatably to tension roll 25.

Referring again to FIG. 1, the folding belt 11 is unfolded at 31 as it passes around tail roll 12 and head roll 13. Therefore, the tail roll 12 and the head roll 13 has to be at least twice the width of the belt between the fold lines 30. Also, the head and tail rolls are twice the width of the idler rolls 14. The tension on the folding belt tends to cause the belt to want to fold inwardly, but to insure its proper folding and unfolding, it is essential that the belt have a transition distance of 7 to 15 times W of travel from the head and tail pulleys. The belt is supported by troughing idler rolls as needed throughout this transition length.

Figure 6:
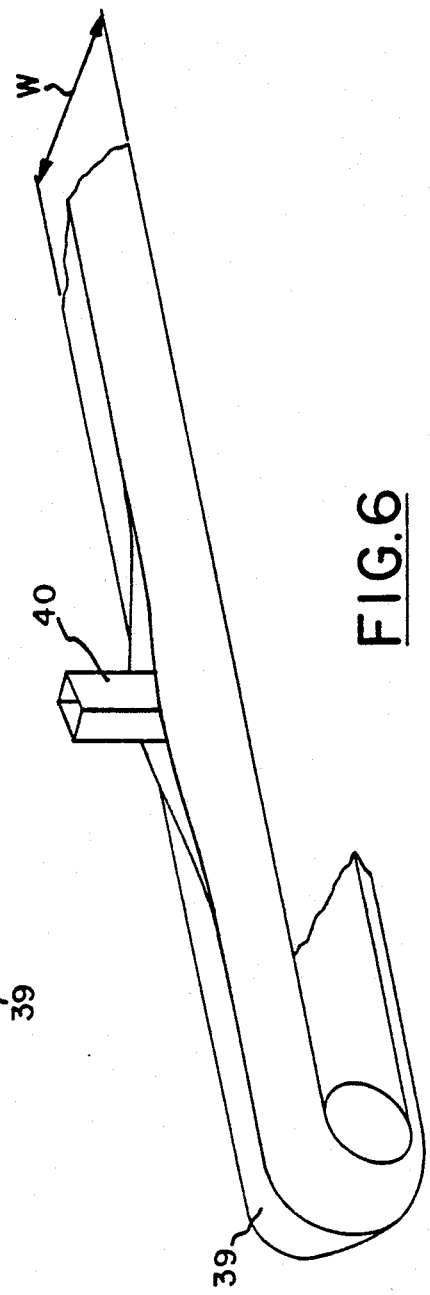
FIG. 6 is an enlarged view of the tail terminal showing an embodiment having a loading chute positioned in the apparatus whereby the belt can be on-loaded without fully opening the flaps.
Figure 7:
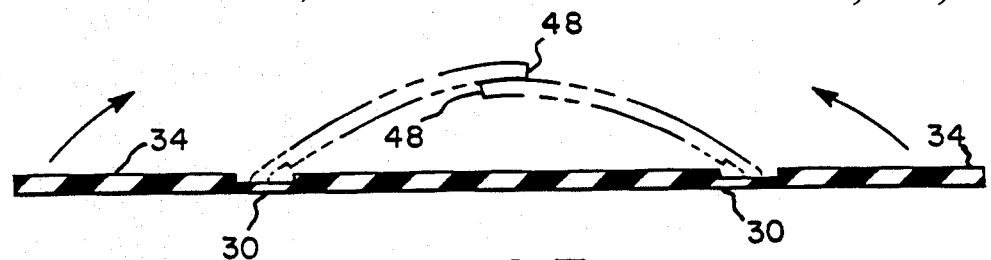
FIG. 7 is a cross-sectional view of a conventional belt which has had two longitudinal sections removed to form the fold lines.

A folding belt conveyor system according to this invention in its preferred embodiment requires head and tail pulleys that are twice as wide as the systems idler rolls and a transition area at both head and tail ends if the loading chute of FIG. 6 is not used. This embodiment of the invention permits an existing conveyor system to be modified in two ways to provide a facility in accordance with the instant invention, namely, the head and tail pulleys of a conventional conveyor system are replaced with head and tail pulleys twice as wide and are provided with loading and unloading transition areas to provide for opening the belt as it passes over the tail and head pulleys to permit the belt to be loaded and unloaded. Alternately, the conventional belt system can be altered by leaving the head and tail pulleys the same, but modify the idlers to half their original width and provide transition loading and unloading areas. Naturally the preferred modification is where the head and tail pulleys are enlarged as in the first modification, but the second modification would be desirable where space limitations makes providing the wider head and tail pulleys undesirable.

Referring to FIGS. 2 and 3, to insure proper folding and unfolding of the belt, idler rolls 14 and troughing idler rollers 32 may be positioned in the transition length to aid in the support of the open belt. Closing rollers 33 may be placed along the closed portion of the folding belt to aid in keeping the belt closed. This especially is desirable on steep grades of 30° to 45° or more such as where the conveyor is operating in an open pit mine or on a grain elevator.

The nature of the transition area is more clearly shown in FIG. 5. The terminal roll, either head 13 or tail 12, has the belt passing around it in the unfolded or flat position 34 showing the flaps 35 unfolded about fold lines 30 to rest in contact with the surface 36 of the respective head or tail pulleys. As indicated before, the tension applied to the belt in the transition area and construction of the belt with fold lines causes the belt as it moves toward the head or tail roll to open as shown in FIG. 5 where the belt moves from the fully closed position 37 to the fully open position. Then as the belt passes the head roll 13 and looses its load of bulk material it slowly closes to present the fully closed position 39 on the return run.

Sometimes for space limitation, it is desirable not to open the belt on the tail or loading end. In this case the tail end roll is only the width "w" of the belt and the belt is run closed as shown in FIG. 6. In this case a loading chute 40 is positioned inside the belt to force it open as the belt moves pass the chute and thus the belt is loaded as the material drops down the chute. I discovered that this embodiment operates best where there is a transition length or zone surrounding the chute. Best results are obtained when the chute is placed about the midpoint of the transition length which is 7 to 15 times the width of the belt. Thus the midpoint is 3.5 to 7.5 W from the end of the transition zones.

In general, the conveyor system of this invention will be about 250 to 1000 or more meters, and will permit greater loads to be carried on the belt as illustrated by FIG. 4 where numeral 41 indicates the maximum load carrying capacity of a conventional belt and numerals 42 and 43 respectively designate the minimum and maximum capacities of the folding belt of this invention. For these greater loads the drive systems of the belt must be sufficient to handle the increased load and speed of the belt. The drive system, motors, etc., are well known and need no description to those skilled in the conveyor belt art or how to calculate required power for the loads to be handled.

Although this invention has been described in straight runs, those of ordinary skill readily appreciates that the system could be operated around curves with properly banked lateral turns. Likewise, where steep angle conveying is desired the usual devices such as cover belts, hugger belts, rubber covered drums or rolls, terra-tires, etc., may be used, but for normal operations they are not essential.

Figure 8:
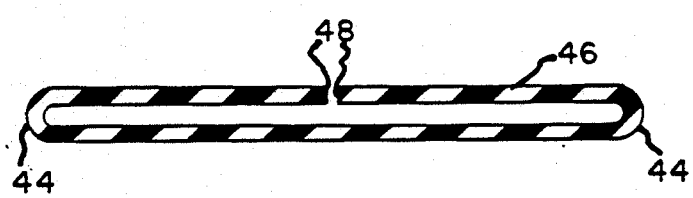
FIG. 8 is a cross-sectional view showing a conventional belt partially cured and folded over to form two fold lines and then fully cured in this position to yield a folded belt.

A belt especially useful in this invention such as a conventional belt plied up of conventional rubbers such as a sulfur carbon black butadiene styrene or butadiene acrylonitrile rubber was cured preferably at elevated temperature, about 40° C.–190° C., 40–60% and preferably to about 30–40% of its cure in the flat unfolded open position with longitudinal hinge areas molded into the belt as shown by lines 44 of FIG. 8. Then the areas were formed by folding the flaps 46 over to bring the edges into the laid over position 48. A shim or a flat strip of steel (not shown) may be used 8. It is preferred that the flaps 46 in the laid over position have their ends 47 lap over so the conveyor is completely closed. Talc and related mold releases may be used to prevent sticking to the mold or the rubber sticking to itself. A belt made as above was vulcanized spliced to give a continuous belt which was tested on the Herman Morse belt tester for the equivalent of 486 hours at a speed of about 800 meters per minute with the flaps open at the head pulley, but closed at the tail pulley analogous to the embodiment of FIG. 6. Normal test conditions on the Herman Morse belt tester is 500 hours at 800 meters per minute. This embodiment performed satisfactory on the Herman Morse belt tester. It was observed during the test runs that the use of a silicone oil lubricant on the edges of the flaps reduce belt wear. Also, the test belt could be used for much longer runs as there was no evidence of belt failure.

A fully cured conventional rubber multiple plied up coal belt, i.e. a sulfur cured natural rubber fabric belt was grooved by slitting longitudinally through the first layer of rubber to form two parallel axial fold lines 47. Then the rubber was removed through the first layer or ply to give a fold line area about 2.5 centimeters wide, and two plys thick. It was removed preferably by pulling the cut strip away or by abrading away with an abrader. Multiple plied belts should be reduced to two plys in the hinge area for preferred embodiments. This cut grooved belt was run on the Herman Morse belt tester and was found to give satisfactory service when operated according to this invention.

Another suitable embodiment is a hinge groove which is molded into the belt cover during cure. The key to this technique is to use a suitably shaped molding device which displaces enough of the conventional multiple ply belts top cover and compresses the multiple plied belt constructions so as to form a preferentially flexible, grooved hinge area, preferably about 1-4 cm. wide and 0.1-2 cm. deep. Alternatively, this technique may be utilized by partially curing the belt with the molded groove hinges and then folding the partially cured belt at the hinges and finishing the cure while folded. This provides a fold belt with self closing hinged cover flaps as shown in FIG. 8 usually of at least one-half w in width. The fold belt will, for most services, be returned with the cover flaps closed to provide a clean return, minimize idler wear, and minimize the width of the return idlers and the conveying structure. The fold belt can be driven and/or run on pulleys with the flaps in the fully open, flat position (preferred), or with the flaps in the fully closed position folded over, on top of the fold belt as it goes around a pulley, but never in the fully closed position, folded under, on the bottom of the fold belt as it goes around a pulley.

While certain representative embodiments and details have been shown for the purpose of illustrating the invention, it will be apparent to those skilled in this art that various changes and modifications may be made therein without departing from the scope of the invention.

What is claimed is:

1. A conveying apparatus with a load carrying portion and a return portion for continuously carrying and unloading a load comprising: an endless driven conveyor belt having a tail terminal at one end and a head terminal at the other end thereof around which said belt passes, said endless conveyor belt being foldable about laterally spaced longitudinal fold axes thereby forming an integral flap laterally outward of said axes on each side of said belt, said pair of integral flaps being adapted to increase the load carrying capacity of the belt and to prevent spillage of said load by closing said integral flaps over said load on the load carrying portion of said conveying apparatus; a means for driving said endless conveyor belt; support rolls positioned at intervals between said tail terminal and said head terminal; means for loading said belt; and a means for unloading said belt, said means for unloading said belt being positioned near the head terminal, said means for loading being positioned near the tail terminal, said tail terminal having a width essentially equal to that of the belt between the laterally spaced longitudinal fold axes, said belt running substantially closed and flattened around said tail terminal with a loading chute for placing said load on said belt at a position near the tail terminal medially of the belt and interposed between said longitudinal sides of said belt to partially open said belt a limited distance as said belt moves past said chute, said belt running closed and flattened along a substantial portion of the return run portion of said belt thereby minimizing spillage along said return portion of said conveying apparatus.

2. The conveying apparatus of claim 1 wherein said limited distance is substantially equal to about 3.5 to 7.5 times said belt width between said longitudinal fold axes of the belt and is provided longitudinally on each side of said loading chute.

3. The conveying apparatus of claim 1 wherein the belt runs substantially flat and open around said head terminal.

4. The conveying apparatus of claim 1 wherein the belt moves under sufficient tension to keep the belt substantially closed along its path except a distance about 7 to 15 times W on either side of the head terminal and about 3.5 to 7.5 times W longitudinally on each side of a feed chute at the tail terminal where W is the width of the belt between said laterally spaced longitudinal fold axes.

5. The conveying apparatus of claim 1 wherein said tail terminal includes a tail roll equal in length to the transverse distance between said laterally spaced longitudinal fold axes and said support rolls include a plurality of troughing idler rolls arranged under said belt at intervals along said belt, said troughing idler rolls having a length approximately one half the length of said tail roll.

6. A conveying apparatus of claim 5 further comprising a plurality of pairs of closing rollers compressively contacting said integral flaps to assure closure of said belt over the load, said rollers being spaced at intervals along said belt between said head terminal and said tail terminal.

7. A conveying apparatus of claim 1 wherein each integral flap of said belt is coated with a silicone lubricant to minimize wear and friction.

8. The conveying apparatus of claim 1 wherein each of said laterally spaced longitudinal fold axes consist of a narrow, longitudinal groove extending through a minority of the thickness of said belt to provide a hinge area for easy folding of said belt.

9. A conveying apparatus according to claim 8 wherein said grooves are integrally molded into said belt during manufacture of said belt.

10. A conveying apparatus according to claim 8 wherein said belt is shaped to resiliently assume a closed shape where said pair of integral flaps cover the portion of said belt between said laterally spaced longitudinal fold axes except when said pair of integral flaps are moved upward by a means for continuously opening said flaps.

11. A conveying apparatus including an endless driven conveyor belt having a tail terminal at one end and a head terminal at the other end thereof around which said belt passes, said endless conveyor belt being foldable about laterally spaced longitudinal fold axes to close said belt bringing opposite longitudinal edge portions of said belt into contact with each other to increase the load carrying capacity of the belt, a drive means connected drivably in cooperative action with said endless conveyor belt, support rolls positioned at intervals between said tail terminal and said head terminal to cause the belt to trough to increase its load carrying capacity, means to load the belt and a means to permit unloading of said belt, said means to permit unloading of said belt being positioned at the head terminal with the longitudinal fold axes and each edge of said belt being coated with a silicone lubricant.

* * * * *